United States Patent
Zhou (10) Patent No.: US 11,234,271 B2
(45) Date of Patent: Jan. 25, 2022

(54) UPLINK TRANSMISSION METHOD, DEVICE, USER TERMINAL, AND BASE STATION

(71) Applicant: BAICELLS TECHNOLOGIES CO. LTD., Beijing (CN)

(72) Inventor: Mingyu Zhou, Beijing (CN)

(73) Assignee: Baicells Technologies Co. Ltd., Beijing (CN)

( * ) Notice: Subject to any disclaimer, the term of this patent is extended or adjusted under 35 U.S.C. 154(b) by 255 days.

(21) Appl. No.: 16/096,378

(22) PCT Filed: Apr. 14, 2017

(86) PCT No.: PCT/CN2017/080523
§ 371 (c)(1),
(2) Date: Feb. 11, 2019

(87) PCT Pub. No.: WO2017/185998
PCT Pub. Date: Nov. 2, 2017

(65) Prior Publication Data
US 2020/0008241 A1    Jan. 2, 2020

(30) Foreign Application Priority Data
Apr. 26, 2016    (CN) .......................... 201610266884.4

(51) Int. Cl.
*H04W 74/08* (2009.01)
*H04L 5/00* (2006.01)
(Continued)

(52) U.S. Cl.
CPC ....... *H04W 74/0816* (2013.01); *H04L 5/0053* (2013.01); *H04W 72/0446* (2013.01);
(Continued)

(58) Field of Classification Search
CPC ......... H04W 72/0446; H04W 72/1205; H04W 74/0816; H04L 5/0053
See application file for complete search history.

(56) References Cited

U.S. PATENT DOCUMENTS

2010/0284354 A1* 11/2010 Ostergaard ........ H04W 72/1284
370/329
2014/0177517 A1    6/2014 Hakola et al.
(Continued)

FOREIGN PATENT DOCUMENTS

CN    101483828 A    7/2009
CN    101959216 A    1/2011
(Continued)

OTHER PUBLICATIONS

Intel Corporation, "On the Support of Cross-burst Scheduling", 3rd Generation Partnership Project, 3GPP TSG RAN WG1 Meeting #84bis, Busan, Korea, Apr. 11-15, 2016, R1-162353, vol. No. RAN WG1, XP051080132, Internet: URL:http://www.3gpp.org/ftp/tsg_ran/WG 1_RL1/TSGR1_84b/Docs/.
(Continued)

*Primary Examiner* — Jamal Javaid
*Assistant Examiner* — Ryan C Kavleski
(74) *Attorney, Agent, or Firm* — Moser Taboada (57) ABSTRACT

The present disclosure provides an uplink transmission method, an uplink transmission device, a user terminal and a base station. The uplink transmission method includes: acquiring uplink scheduling information transmitted by a base station and indication information of a transmission opportunity currently occupied by the base station; determining a position of an uplink channel scheduled for the user terminal by the base station in accordance with the uplink scheduling information; determining a listening type of the uplink channel in accordance with the position of the uplink channel and the indication information of the transmission
(Continued)

opportunity; and transmitting uplink data to the base station in the uplink channel when the uplink channel is listened to be in an idle state using the listening type of the uplink channel.

15 Claims, 6 Drawing Sheets

(51) Int. Cl.
   *H04W 72/04* (2009.01)
   *H04W 72/12* (2009.01)
(52) U.S. Cl.
   CPC ... *H04W 72/1205* (2013.01); *H04W 72/1268* (2013.01); *H04W 72/1289* (2013.01)

(56) References Cited

U.S. PATENT DOCUMENTS

| | | | |
|---|---|---|---|
| 2014/0334387 A1 | 11/2014 | Doppler et al. | |
| 2017/0280475 A1* | 9/2017 | Yerramalli | H04W 72/10 |
| 2019/0053222 A1* | 2/2019 | Bhorkar | H04W 72/14 |

FOREIGN PATENT DOCUMENTS

| | | |
|---|---|---|
| CN | 102740469 A | 10/2012 |
| CN | 104066198 A | 9/2014 |
| CN | 104812032 A | 7/2015 |
| EP | 2645801 A1 | 10/2013 |
| EP | 3369283 A1 | 9/2018 |
| WO | WO-2017165723 A1 | 9/2017 |

OTHER PUBLICATIONS

Intel Corporation, "UL LBT details", 3rd Generation Partnership Project, 3GPP TSG RAN WG1 Meeting #84bis, Busan, Korea, Apr. 11-15, 2016, R1-162359, vol. No. RAN WG1, XP051080138, Internet: URL:http://www.3gpp.org/ftp/tsg_ran/WG 1_RL1/TSGR1_84b/Docs/.

MEDIATEK Inc., "On priority classes for uplink LBT", 3rd Generation Partnership Project, 3GPP TSG-RAN2#93BIS meeting; Dubrovnik, Croatia, Apr. 11-15, 2016, R2-162368, vol. No. RAN WG2, XP051082240, Internet; URL: http://www.3gpp.org/ftp/tsg_ran/WG2_RL2/TSGR2_93bis/Docs/.

Nokia et al., "Channel Access for LAA UL", 3rd Generation Partnership Project, 3GPP TSG RAN WG1 Meeting #84bis, Busan, South Korea, Apr. 11-15, 2016, R1-162920, vol. No. RAN WG1, XP051080412, Internet: URL:http://www.3gpp.org/ftp/tsg_ran/WG 1_RL1/TSGR1_84b/Docs/.

SONY, "UL Channel access mechanism design in eLAA",3rd Generation Partnership Project, 3GPP TSG RAN WG1 Meeting #84bis, Busan, Korea, Apr. 11-15, 2016, R1-162555 vol. No. RAN WG1, XP051079614, Internet: URL:http://www.3gpp.org/ftp/tsg_ran/WG 1_RL1/TSGR1_84b/Docs/.

European Extended Search Report for Patent Application No. EP17788650.4, dated Jan. 13, 2020.

International Search Report dated Jul. 3, 2017 for PCT Application No. PCT/CN2017/080523.

Huawei, "Discussion on the application of LBT options in eLAA" dated Apr. 15, 2016.

Nokia, "Channel Access for LAA UL" dated Apr. 15, 2016.

\* cited by examiner

UPLINK TRANSMISSION METHOD, DEVICE, USER TERMINAL, AND BASE STATION

CROSS-REFERENCE TO RELATED APPLICATIONS

The present application is based on International Application No. PCT/CN2017/080523 filed Apr. 14, 2017, which claims priority to Chinese Patent Application No. 201610266884.4, filed on Apr. 26, 2016, the contents of which are incorporated herein by reference in its entirety.

The present disclosure claims priority to Chinese Patent Application No. 201610266884.4, filed to the Chinese Patent Office on Apr. 21, 2016 and titled "Uplink transmission method and device, user terminal and base station", the content of which is incorporated herein by reference in its entirety.

TECHNICAL FIELD

The present disclosure relates to the field of communication technologies, and in particular to an uplink transmission method, an uplink transmission device, a user terminal and a base station.

BACKGROUND

A mobile communication system means a system by which an operator provides communication services for a user terminal (e.g., a mobile phone) by deploying a wireless access network device (e.g., a base station), a core network device (e.g., a Home Location Register, HLR), etc. Mobile communication has experienced the first, second, third and fourth generations. The first generation of mobile communication means an original analog voice-only cellular phone standard, mainly using the analog technology and the Frequency Division Multiple Access (FDMA) method. The second generation of mobile communication introduces the digital technology to improve the network capacity, the voice quality and confidentiality, represented by Global System for Mobile Communication (GSM) and Code Division Multiple Access (CDMA IS-95). The third generation of mobile communication mainly means three technologies of CDMA2000, WCDMA and TD-SCDMA, all of which are based on the CDMA. The fourth generation of mobile communication has relatively internationally unified standards, is Long Term Evolution/Long Term Evolution-Advanced (LTE/LTE-A) established by 3GPP (the 3rd Generation Partnership Project) of the International Organization for Standardization, has an access manner in which the downlink is based on Orthogonal Frequency Division Multiple Access (OFDMA) and the uplink is based on Single Carrier-Frequency Division Multiple Access (SC-FDMA), and achieves high-speed transmission with a downlink peak value of 1 Gbps and an uplink peak value of 500 Mbps based on a flexible bandwidth and a self-adaptive modulation and coding mode.

Figure 1:
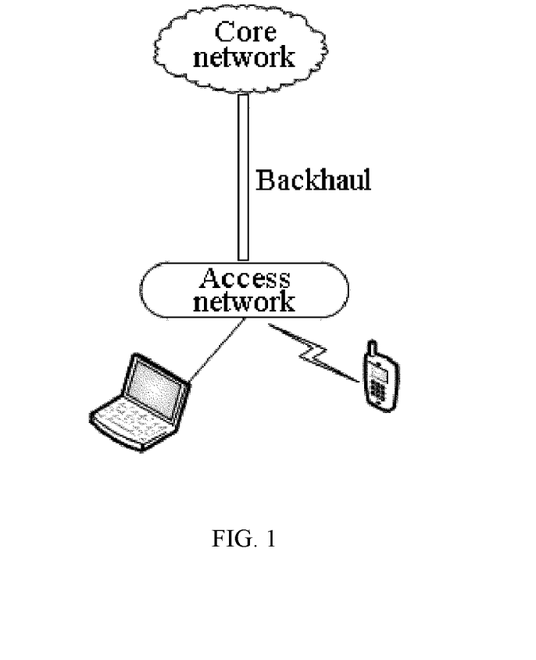
FIG. 1 is a schematic diagram of a basic structure of a mobile communication network.

The following FIG. 1 briefly shows a basic structure of a mobile communication network, in which a terminal establishes a communication connection with a core network via an access network.

MulteFire is an LTE technology which redefines the uplink transmission method based on the LTE R13 LAA downlink transmission method and can independently work in a non-licensed frequency band, namely, stand-alone LTE-U. In the existing LTE, the physical uplink shared channel (PUSCH) transmission is scheduled by an evolved node base station (eNB) transmitting uplink (UL) grants.

For example, in an LTE-FDD system, an eNB transmits a UL grant in an n-th subframe, and a UE transmits a PUSCH in an (n+4)th subframe. In LTE R14 eLAA and MulteFire, uplink data transmission in non-licensed frequency bands is supported. As Listen Before Talk (LBT) is required when transmitting uplink data in non-licensed frequency bands, both UL grant and PUSCH require LBT.

In eLAA and MulteFire, the access priority level selected by an eNB determines the LBT parameters and the maximum allowable channel occupation time (the longer the random backoff time is, the lower the access priority level is and the longer the maximum allowable channel occupation time is; and vice versa). The maximum allowable channel occupation time is called MCOT in eLAA/LAA, and is called transmission opportunity (TXOP) in MulteFire. But later, it is uniformly described as TXOP.

Figure 2:
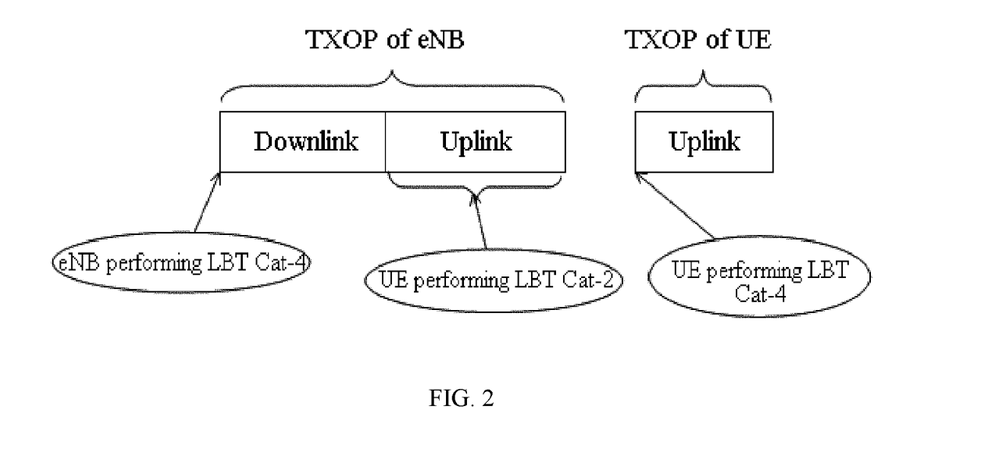
FIG. 2 is a schematic diagram of a data transmission opportunity.

As shown in FIG. 2, when the scheduled PUSCH of a UE is within the TXOP corresponding to the LBT cat-4 used by an eNB when transmitting a downlink (or the downlink of the eNB occupies only a part of the TXOP, and the remaining TXOP can be used by the uplink), the LBT of the UE can perform LBT cat-2 for only 25 us. When the scheduled PUSCH of the UE is outside the TXOP corresponding to the LBT used by the eNB when transmitting a downlink, MulteFire specifies that the UE needs to perform LBT cat-4. In addition, both eLAA and MulteFire support the manner of scheduling using one UL grant for the PUSCH transmission over multiple subframes. When using one UL grant to schedule the PUSCH transmission over multiple subframes, due to restrictions of the TXOP of the eNB, the transmission can only be scheduled to be within the TXOP. The terminals scheduled outside the TXOP of the eNB need to use another type of LBT and require individual UL grants for scheduling, so that the number of UL grants is increased, and the downlink resource overhead is increased.

SUMMARY

The present disclosure provides an uplink transmission method, an uplink transmission device, a user terminal and a base station to solve the problem in the prior art that the uplink channels within and outside a transmission opportunity of a base station require different uplink scheduling information for scheduling so that the downlink channel resource overhead is excessively large.

Embodiments of the present disclosure provide an uplink transmission method applied in a user terminal and including: acquiring uplink scheduling information transmitted by a base station and indication information of a transmission opportunity currently occupied by the base station; determining a position of an uplink channel scheduled for the user terminal by the base station in accordance with the uplink scheduling information; determining a listening type of the uplink channel in accordance with the position of the uplink channel and the indication information of the transmission opportunity, wherein a listening type used when the uplink channel is within the transmission opportunity is different from a listening type used when the uplink channel is outside the transmission opportunity; and transmitting uplink data to the base station in the uplink channel when the uplink channel is listened to be in an idle state using the listening type of the uplink channel Another aspect of the present disclosure provides an uplink transmission method applied in a base station and including: transmitting uplink scheduling information and indication information of a transmission opportunity currently occupied by the base station to a user terminal, such that the user terminal determines a position of an uplink channel scheduled by the base station for the user terminal in accordance with the uplink scheduling information, and determines a listening type of the uplink channel in accordance with the position of the uplink channel and the indication information of the transmission opportunity, wherein a listening type used when the uplink channel is within the transmission opportunity is different from a listening type used when the uplink channel is outside the transmission opportunity; and receiving uplink data transmitted by the user terminal in an uplink channel which is listened to be in an idle state using the listening type of the uplink channel.

Yet another aspect of the present disclosure provides an uplink transmission device applied in a user terminal and including: an acquiring module configured to acquire uplink scheduling information transmitted by a base station and indication information of a transmission opportunity currently occupied by the base station; a first processing module configured to determine a position of an uplink channel scheduled for the user terminal by the base station in accordance with the uplink scheduling information; a second processing module configured to determine a listening type of the uplink channel in accordance with the position of the uplink channel and the indication information of the transmission opportunity, wherein a listening type used when the uplink channel is within the transmission opportunity is different from a listening type used when the uplink channel is outside the transmission opportunity; and a first transmitting module configured to transmit uplink data to the base station in the uplink channel when the uplink channel is listened to be in an idle state using the listening type of the uplink channel.

Yet another aspect of the present disclosure provides an uplink transmission device applied in a base station and including: a second transmitting module configured to transmit uplink scheduling information and indication information of a transmission opportunity currently occupied by the base station to a user terminal, such that the user terminal determines a position of an uplink channel scheduled by the base station for the user terminal in accordance with the uplink scheduling information, and determines a listening type of the uplink channel in accordance with the position of the uplink channel and the indication information of the transmission opportunity, wherein a listening type used when the uplink channel is within the transmission opportunity is different from a listening type used when the uplink channel is outside the transmission opportunity; and a receiving module configured to receive uplink data transmitted by the user terminal in an uplink channel which is listened to be in an idle state using the listening type of the uplink channel.

Yet another aspect of the present disclosure provides a user terminal including: a receiver configured to acquire uplink scheduling information transmitted by a base station and indication information of a transmission opportunity currently occupied by the base station; a processor connected to the receiver and configured to: determine a position of an uplink channel scheduled for the user terminal by the base station in accordance with the uplink scheduling information; and determine a listening type of the uplink channel in accordance with the position of the uplink channel and the indication information of the transmission opportunity, wherein a listening type used when the uplink channel is within the transmission opportunity is different from a listening type used when the uplink channel is outside the transmission opportunity; and a transmitter configured to transmit uplink data to the base station in the uplink channel when the uplink channel is listened to be in an idle state using the listening type of the uplink channel.

Yet another aspect of the present disclosure provides a base station including: a transmitter configured to transmit uplink scheduling information and indication information of a transmission opportunity currently occupied by the base station to a user terminal, such that the user terminal determines a position of an uplink channel scheduled by the base station for the user terminal in accordance with the uplink scheduling information, and determines a listening type of the uplink channel in accordance with the position of the uplink channel and the indication information of the transmission opportunity, wherein a listening type used when the uplink channel is within the transmission opportunity is different from a listening type used when the uplink channel is outside the transmission opportunity; and a receiver configured to receive uplink data transmitted by the user terminal in an uplink channel which is listened to be in an idle state using the listening type of the uplink channel.

Embodiments of the present disclosure further provide a non-transitory computer-readable storage medium storing computer instructions configured to cause a computer to perform the uplink transmission method applied in a user terminal described as above in the present disclosure.

Embodiments of the present disclosure further provide a non-transitory computer-readable storage medium storing computer instructions configured to cause a computer to perform the uplink transmission method applied in a base station described as above in the present disclosure.

Embodiments of the present disclosure further provide a computer program product, including a computer program stored on a non-transitory computer readable storage medium, the computer program including program instructions which, when executed by a computer, cause the computer to perform the uplink transmission method applied in a user terminal described as above in the present disclosure.

Embodiments of the present disclosure further provide a computer program product, including a computer program stored on a non-transitory computer readable storage medium, the computer program including program instructions which, when executed by a computer, cause the computer to perform the uplink transmission method applied in a base station described as above in the present disclosure.

The above technical solutions of the present disclosure can produce the following advantageous effects.

The base station transmits the indication information of the transmission opportunity used by itself to the user terminal, such that the user terminal can determine the positional relationship between the uplink channel scheduled for the user terminal and the transmission opportunity used by the base station in accordance with the uplink scheduling information and the indication information of the transmission opportunity, and can automatically determine and switch the listening type at different positions. The listening type used when the uplink channel is within the transmission opportunity is different from the listening type used when the uplink channel is outside the transmission opportunity. In this way, when the base station schedules multiple subframes for the user terminal requesting for uplink scheduling, the number of scheduled subframes will not be restricted by the current transmission opportunity, and the base station only needs to send the uplink scheduling information once. Thus, the downlink channel resource overhead can be reduced, and the network resources can be saved.

DESCRIPTION OF EMBODIMENTS

In order to make the technical problems to be solved by the present disclosure, the technical solutions, and advantages of the present disclosure to be clearer, the embodiments of the present disclosure are described in detail in the followings with reference to the accompanying drawings.

In an MF network of the prior art, when a base station schedules multiple subframes for a user terminal, the number of the subframes will be restricted by a TXOP of the base station. The subframes may only be scheduled by the uplink scheduling information to be within the TXOP. The subframes scheduled outside the TXOP require independent uplink scheduling information for scheduling, so that the quantity of the uplink scheduling information is increased, and the downlink channel resource overhead is increased. The following embodiments of the present disclosure provide an uplink transmission method and device, a user terminal and a base station. The uplink scheduling information and indication information of the currently occupied transmission opportunity are transmitted to the user terminal by the base station. In this way, when the base station schedules multiple subframes for the user terminal, the number of the scheduled subframes will not be restricted by the current transmission opportunity and the base station only needs to transmit the uplink scheduling information once. Thus, the downlink channel resource overhead can be reduced, and the network resources can be saved.

First Embodiment

Figure 3:
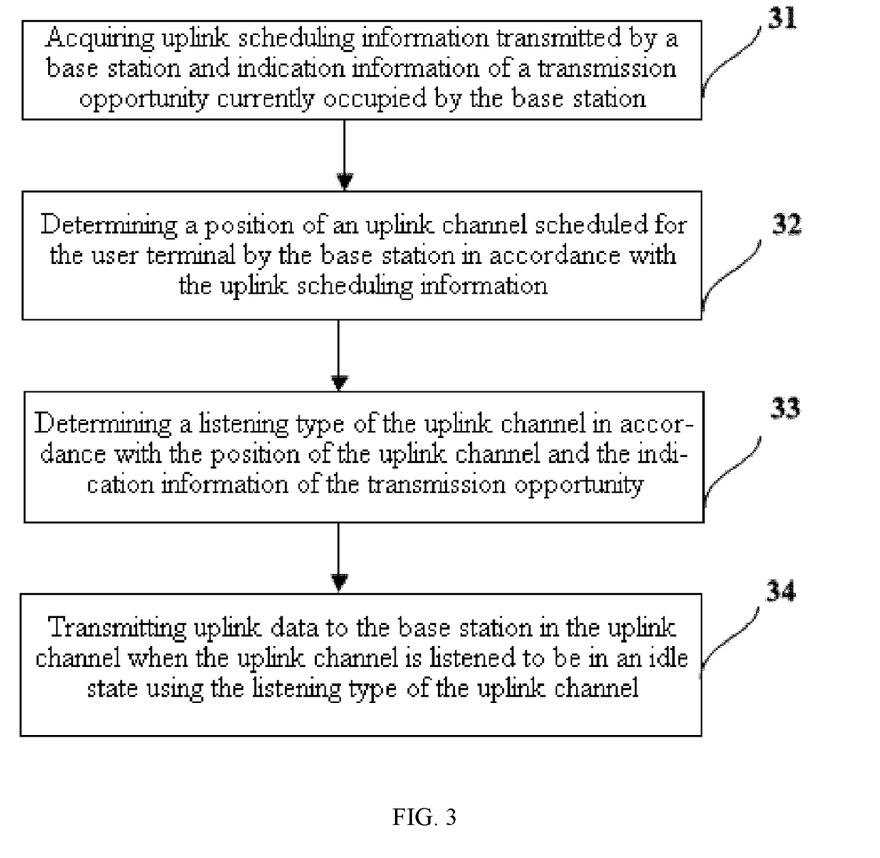
FIG. 3 is a flowchart of an uplink transmission method according to a first embodiment of the present disclosure.

As shown in FIG. 3, the embodiment of the present disclosure provides an uplink transmission method, particularly including the following steps.

At Step 31, uplink scheduling information transmitted by a base station and indication information of a transmission opportunity currently occupied by the base station are acquired.

The uplink scheduling information carries information which represents a position of a resource occupied by an uplink channel scheduled by the base station for the user terminal, for example, a serial number of the position of the resource occupied by the scheduled uplink channel. The uplink channel may be an uplink transmission channel for transmitting an uplink data signal, e.g., PUSCH, and may also be an uplink transmission channel for transmitting a control signal, such as ePUCCH or sPUCCH.

The TXOP of the base station means the maximum allowable channel occupation time of the base station. The indication information of the TXOP of the base station carries indication information that represents a position of the TXOP of the base station, and in particular, includes at least one of information on a length of the time occupied in the TXOP, information on a length of the remaining time other than the time occupied in the TXOP, listening type information (such as LBT cat-2 or LBT cat-4), listening type switching information, and a relationship between the listening type and a scheduled uplink channel.

At Step 32, a position of an uplink channel scheduled for the user terminal by the base station in determined in accordance with the uplink scheduling information.

Figure 4:
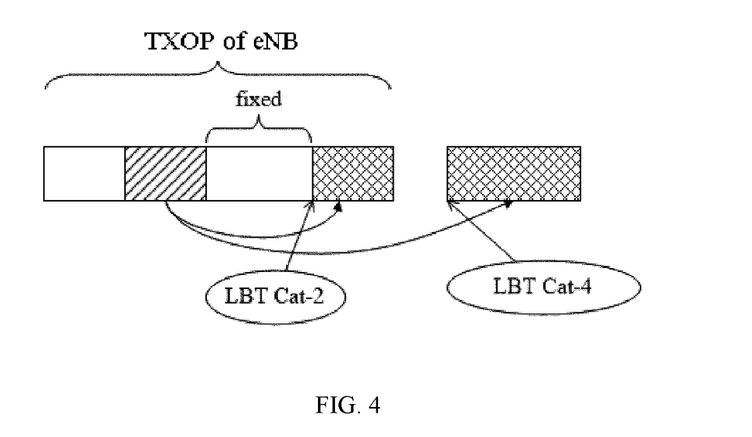
FIG. 4 is a schematic diagram of transmission of a data transmission opportunity according to the first embodiment of the present disclosure.

Since the uplink scheduling information carries the information on the position of the resource occupied by the uplink channel scheduled by the base station for the user terminal, the user terminal may parse and get the position of the uplink channel scheduled by the base station for the user terminal in accordance with the uplink scheduling information. As shown in FIG. 4, the uplink channel includes a plurality of transmission subframes across the TXOP of the base station. That is, a part of the plurality of transmission subframes are located within the TXOP of the base station, and the other transmission subframes are located outside the TXOP of the base station. In other words, the number of the transmission subframes scheduled for the user terminal is not restricted by the TXOP of the base station. It is worth noting that the user terminal may transmit uplink data in the uplink transmission channel scheduled by the base station for the user terminal. The uplink channel scheduled by the base station for the user terminal includes an uplink transmission channel located within the TXOP of the base station and an uplink transmission channel (also called the transmission opportunity of the user terminal) located outside the TXOP of the base station.

At Step 33, a listening type of the uplink channel is determined in accordance with the position of the uplink channel and the indication information of the transmission opportunity.

The user terminal needs to listen to the corresponding uplink channel before transmitting the uplink data through the uplink channel scheduled by the base station for the user terminal. Only when the uplink channel is listened to be in an idle state, transmission may be performed in the uplink channel. A listening type used when the uplink channel is within the transmission opportunity is different from a listening type used when the uplink channel is outside the transmission opportunity. That is, the listening type used by the user terminal to listen to the uplink channel, which is scheduled by the base station for the user terminal and is located within the TXOP of the base station, is different from the listening type used by the user terminal to listen to the uplink channel, which is scheduled by the base station for the user terminal and is located outside the TXOP of the base station. The listening type of the corresponding uplink channel is determined in accordance with a positional relationship between the uplink channel scheduled for the user terminal and the TXOP of the base station, and the idle state of the uplink channel is listened.

At Step 34, when the uplink channel is listened to be in an idle state using the listening type of the uplink channel, uplink data is transmitted to the base station in the uplink channel.

When the user terminal performs listening using a suitable listing type to determine that the corresponding uplink channel is in the idle state, the user terminal transmits uplink data to be transmitted to the base station through the uplink channel. Thus, the user terminal can determine the positional relationship between the uplink channel scheduled for the user terminal and the transmission opportunity used by the base station in accordance with the uplink scheduling information and the indication information of the transmission opportunity, can automatically determine and switch the listening type at different positions, and can transmit the uplink data to the base station when an uplink channel is listened to be in the idle state. In this way, when the base station schedules multiple subframes for the user terminal requesting for uplink scheduling, the number of scheduled subframes will not be restricted by the current transmission opportunity, and the base station only needs to transmit the uplink scheduling information once. Thus, the downlink channel resource overhead can be reduced, and the network resources can be saved.

Second Embodiment

Figure 5:
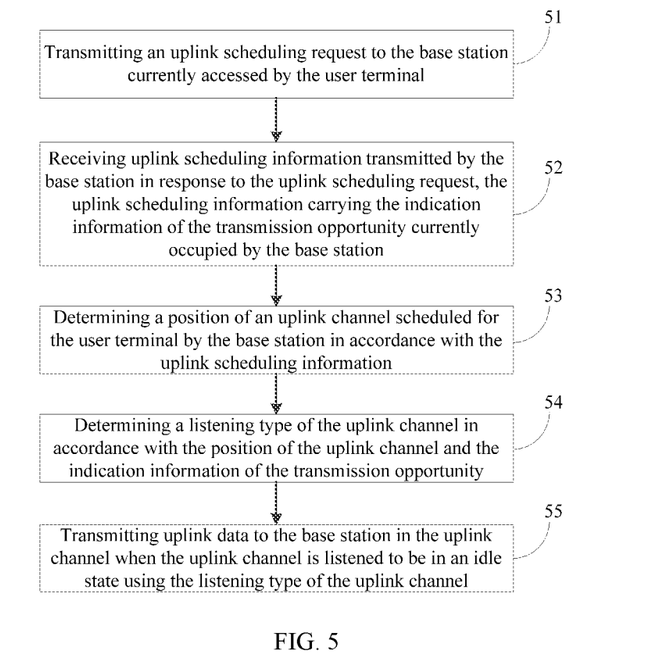
FIG. 5 is a flowchart of an uplink transmission method according to a second embodiment of the present disclosure.

As shown in FIG. 5, the second embodiment of the present disclosure provides an uplink transmission method, particularly including the following steps.

At Step 51, an uplink scheduling request is transmitted to the base station currently accessed by the user terminal.

At Step 52, uplink scheduling information transmitted by the base station in response to the uplink scheduling request is received, and the uplink scheduling information carries the indication information of the transmission opportunity currently occupied by the base station.

At Step 53, a position of an uplink channel scheduled for the user terminal by the base station is determined in accordance with the uplink scheduling information.

At Step 54, determining a listening type of the uplink channel is determined in accordance with the position of the uplink channel and the indication information of the transmission opportunity.

At Step 55, when the uplink channel is listened to be in an idle state using the listening type of the uplink channel, uplink data is transmitted to the base station in the uplink channel.

It is mentioned here that the indication information of the TXOP of the base station is carried into the uplink scheduling information. In particular, the indication information of the TXOP includes at least one of: information on a length of time occupied in the transmission opportunity, information on a length of remaining time other than the time occupied in the transmission opportunity, listening type information, listening type switching information, and a relationship between the listening type and a scheduled uplink channel.

When the uplink scheduling information carries the listening type information, an LBT type that corresponds to each subframe in the uplink scheduling information is indicated. For example, when M subframes are scheduled, the LBT type of each subframe is indicated by a bitmap of M bits (0 represents LBT cat-2 and 1 represents LBT cat-4).

When the uplink scheduling information carries the listening type switching information, the LBT type that corresponds to the first scheduled subframe in the uplink scheduling information and the subframe of which the LBT type is switched are indicated. For example, when one-time LBT type switching is supported, 1 bit represents the LBT type of the first scheduled subframe, L-bit indicates that LBT type switching is performed on a certain subframe in a range from the second to the $(2L)^{th}$ subframe (LBT type switching is not performed when the L-bit represents the first subframe). In particular, for example, 0 of 1 bit indicates that LBT cat-2 is performed on the first scheduled subframe, and LBT type switching of 010 of 3 bit indicates that the LBT type is switched to LBT cat-4 before the third scheduled subframe.

Thus, the user terminal can determine the positional relationship between the uplink channel scheduled for the user terminal and the TXOP of the base station in accordance with the uplink scheduling information that is transmitted by the base station and carries the indication information of the TXOP of the base station, can automatically determine and switch the listening type at different positions, and can transmit the uplink data to the base station when a channel is listened to be in the idle state. In this way, when the base station schedules multiple subframes for the user terminal, restriction from the current TXOP of the base station can be prevented, and the base station only needs to transmit the uplink scheduling information once. Thus, the downlink channel resource overhead can be reduced, and the network resources can be saved.

Third Embodiment

Figure 6:
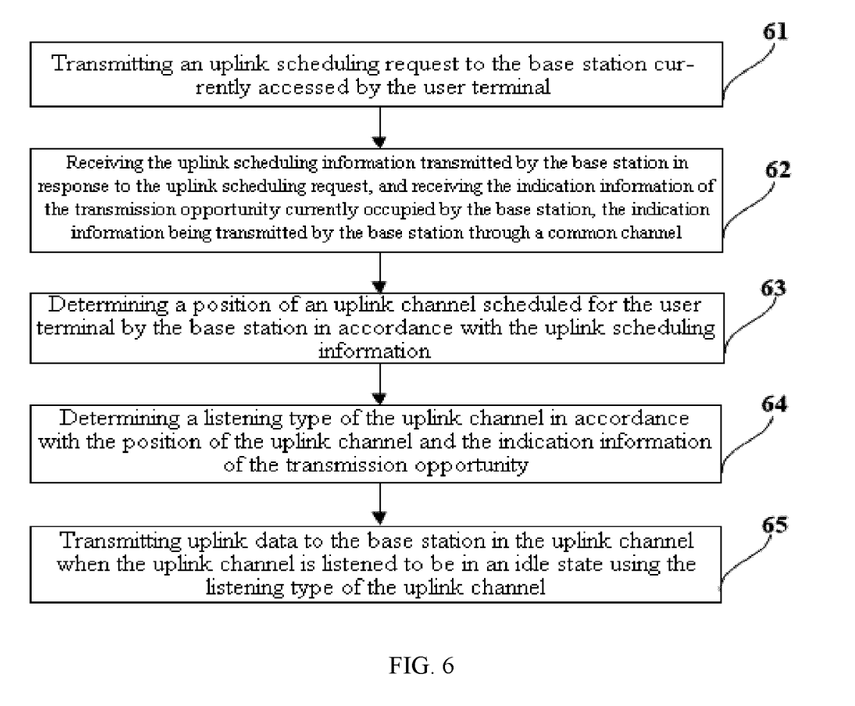
FIG. 6 is a flowchart of an uplink transmission method according to a third embodiment of the present disclosure.

As shown in FIG. 6, the third embodiment of the present disclosure provides an uplink transmission method, particularly including the following steps.

At Step 61, an uplink scheduling request is transmitted to the base station currently accessed by the user terminal.

At Step 62, uplink scheduling information transmitted by the base station in response to the uplink scheduling request is received, and the indication information, transmitted by the base station through a common channel, on the transmission opportunity currently occupied by the base station is received.

At Step 63, a position of an uplink channel scheduled for the user terminal by the base station is determined in accordance with the uplink scheduling information.

At Step 64, a listening type of the uplink channel is determined in accordance with the position of the uplink channel and the indication information of the transmission opportunity.

At Step 65, when the uplink channel is listened to be in an idle state using the listening type of the uplink channel, uplink data is transmitted to the base station in the uplink channel.

It is mentioned here that the uplink scheduling information transmitted by the base station to the user terminal does not carry the indication information of the TXOP of the base station. That is, the uplink scheduling information and the indication information of the TXOP of the base station are independently transmitted. In particular, the uplink scheduling information and the indication information of the TXOP of the base station may be transmitted in different channels. For example, the indication information of the TXOP of the base station may be carried into other common channels (e.g., C-PDCCH). The indication information of the TXOP of the base station includes at least one of: information on a length of time occupied in the transmission opportunity, information on a length of remaining time other than the time occupied in the transmission opportunity, listening type information, listening type switching information, and a relationship between the listening type and a scheduled uplink channel. For example, the user terminal acquires the indication information of the TXOP of the base station through other common channels, which carries information on a length of the TXOP of the base station, and determines that LBT cat-2 is performed before uplink transmission within the TXOP of the base station and LBT cat-4 is performed before uplink transmission outside the TXOP of the base station in accordance with the information on the length of the TXOP of the base station and the position of a scheduled uplink subframe indicated by the uplink scheduling information.

Figure 7:
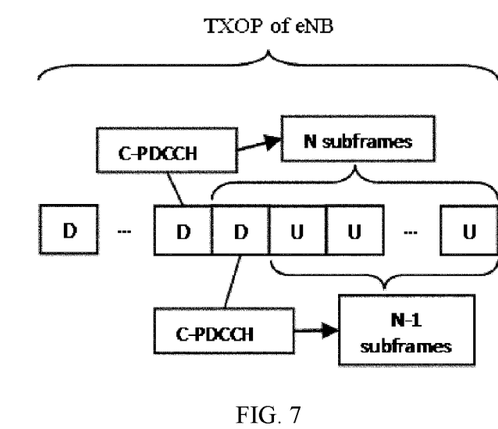
FIG. 7 is a schematic diagram of carrying mapping of indication information according to the third embodiment of the present disclosure.

For example, as shown in FIG. 7, a C-PDCCH is transmitted in a downlink subframe (D) within the TXOP of a base station eNB, and the number of the subframes within the TXOP of the eNB following the current subframe is indicated. It is assumed that the downlink subframe is transmitted in the first half within the TXOP of the eNB and an uplink subframe (U) is transmitted in the second half. For example, it is indicated in the C-PDCCH transmitted in the second last downlink subframe that there are N subframes existing within the TXOP of the eNB following the current subframe. It is indicated in the C-PDCCH transmitted in the last downlink subframe that there are (N-1) subframes existing within the TXOP of the eNB following the current subframe. The user terminal can determine the listening types of different subframes in accordance with the position of the uplink channel scheduled for the user terminal and the number and the positions of the subframes within the TXOP of the eNB, and can transmit the uplink data to the base station when the channel is listened to be in the idle state. In this way, when the base station schedules multiple subframes for the user terminal, restriction from the current TXOP of the base station can be prevented, and the base station only needs to transmit the uplink scheduling information once. Thus, the downlink channel resource overhead can be reduced, and the network resources can be saved.

Fourth Embodiment

Figure 8:
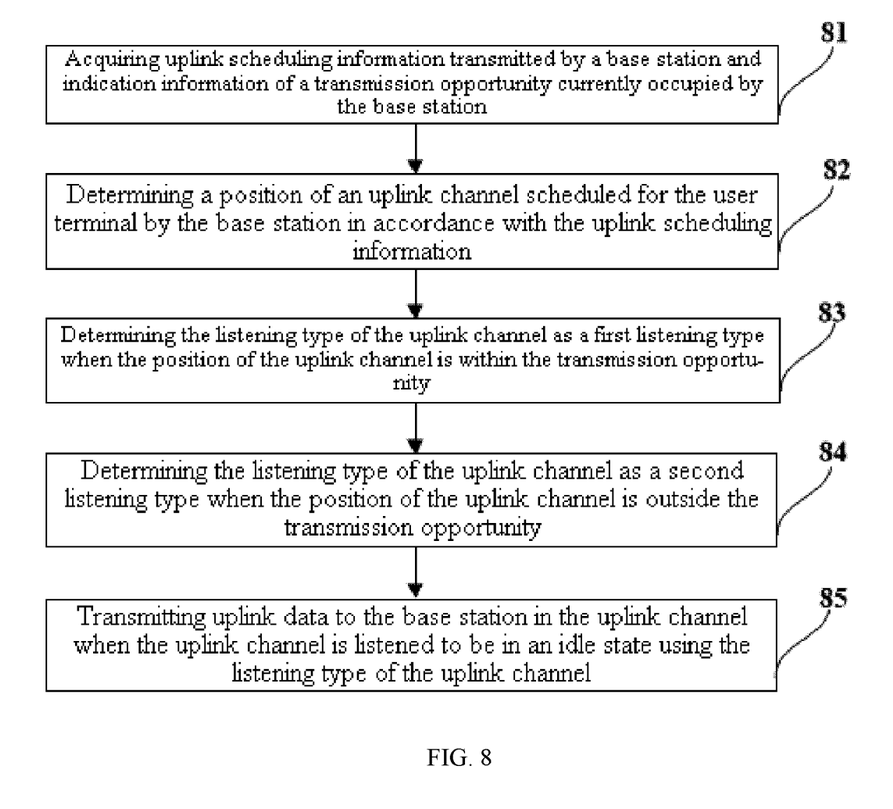
FIG. 8 is a flowchart of an uplink transmission method according to a fourth embodiment of the present disclosure.

Based on the first and third embodiments, as shown in FIG. 8, the fourth embodiment of the present disclosure provides an uplink transmission method, particularly including the following steps.

At Step 81, uplink scheduling information transmitted by a base station and indication information of a transmission opportunity currently occupied by the base station are acquired.

At Step 82, a position of an uplink channel scheduled for the user terminal by the base station is determined in accordance with the uplink scheduling information.

At Step 83, when the position of the uplink channel is within the transmission opportunity, the listening type of the uplink channel is determined as a first listening type.

At Step 84, when the position of the uplink channel is outside the transmission opportunity, the listening type of the uplink channel is determined as a second listening type.

The second listening type is different from the first listening type.

The uplink channel scheduled for the user terminal includes a first uplink channel located within the transmission opportunity of the base station and a second uplink channel located outside the transmission opportunity of the base station. That is, the uplink channel scheduled by the base station for the user terminal includes the first uplink channel located within the TXOP of the eNB and the second uplink channel located outside the TXOP of the eNB. The uplink channels at different positions require different listening types, which may involve listening type switching on the uplink channel scheduled for the user terminal across the TXOP of the eNB.

In particular, the first listening type is employed to listen to the first uplink channel to determine whether the first uplink channel is in the idle state; and when the first uplink channel is in the idle state, the uplink data is transmitted to the base station through the first uplink channel. That is, when an initial position of the uplink channel scheduled for the user terminal is located within the TXOP of the eNB, the uplink channel is listened using LBT Cat-2 having a length of 25 us. When the uplink channel is listened to be in the idle state, the uplink data signal to be transmitted is carried into the uplink channel and transmitted to the base station.

When the first uplink channel ends and the second uplink channel starts, the first listening type is switched to the second listening type. The second listening type is employed to listen to the second uplink channel to determine whether the second uplink channel is in the idle state. When the second uplink channel is in the idle state, the uplink data is transmitted to the base station in the second uplink channel. That is, when the uplink channel reaches an ending position of the TXOP of the eNB, the listening type needs to be switched. In particular, when the uplink channel reaches the ending position of the TXOP of the eNB and the uplink channel located outside the TXOP of the eNB starts, the listening type is switched from LBT Cat-2 having a length of 25 us to the LBT Cat-4 with longer listening time.

After the listening type is switched to the second listening type, an access level of the second listening type needs to be chosen unless only one channel access level is defined for the second listening type. When multiple channel access levels are defined for the second listening type, the user terminal can determine the access level of the second listening type in accordance with the indication information of the TXOP of the eNB and the uplink data to be transmitted. In particular, when it is defined in the standard that the second listening type (e.g., LBT cat-4) supports the multiple access levels (access priorities), the eNB can indicate the corresponding channel access priority for use when a UE performs LBT cat-4. For example, configuration or indication may be performed by RRC and DCI (DL grant, UL grant, C-PDCCH, etc.). The channel access priority of the LBT cat-4 may also be chosen by the UE. The UE may choose the channel access priority in accordance with requirements such as the number of the scheduled subframes outside the TXOP of the eNB and whether the UE needs to be multiplexed with other UE.

A listening channel needs to be reserved when the uplink channel is listened. The specific listening process may be implemented as follows.

Figure 9:
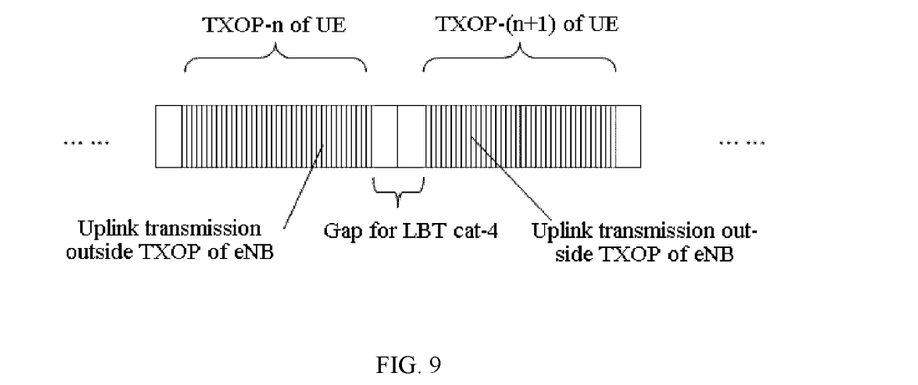
FIG. 9 is a first schematic diagram of transmission of a data transmission opportunity according to the fourth embodiment of the present disclosure.

For switching between the first uplink channel and the second uplink channel, the last N subframes or symbols of the first uplink channel and/or the first N subframes or symbols of the second uplink channel are reserved as listening channels. N is a positive integer. Whether the second uplink channel is in the idle state is determined by listening using the second listening type in the listening channel. As shown in FIG. 9, the last N subframes or OFDM symbols of the TXOP of the eNB or the N subframes or OFDM symbols following the TXOP of the eNB are reserved as the listening channels for the user terminal to perform LBT cat-4 listening, where N is 1, 2, 3, etc. When the shortest LBT time (including T-R-T switching time delay), required by user terminal, of the channel access priority outside the TXOP of the eNB exceeds the maximum value of N, the user terminal may give up uplink transmission of the first subframe scheduled to follow the TXOP of the eNB. However, if the eNB may learn about the channel access priority of the UE, the UE may start transmission of the first subframe outside the TXOP of the eNB from the next subframe.

Further, the second uplink channel outside the TXOP of the eNB may include a plurality of uplink sub-channels (namely, a plurality of UE TXOPs of user terminals). In addition to the above-mentioned that the user terminal employs the second listening type (LBT Cat-4) to listen to the initial position of the TXOP of each UE (or a first transmission subframe within the TXOP of the UE), the user terminal also needs to listen to other transmission subframes within the TXOP of the same UE. In particular, N subframes or symbols at adjacent positions of other uplink sub-channels except the first uplink sub-channel in the second uplink channel are reserved as listening sub-channels. Whether the other uplink sub-channels of the second uplink channels are in the idle state is determined by listening in the listening sub-channels. It is worth mentioning that LBT cat-4 listening is independently performed on initial transmission subframes of the plurality of UE TXOP, and the transmission subframes within the same UE TXOP may be listened through LBT cat-2.

The above-mentioned is the scenario that the initial position of the uplink channel scheduled by the base station for the user terminal is within the TXOP of the eNB and an end position thereof is outside the TXOP of the eNB. However, when a length of time of the uplink channel scheduled for the user terminal is greater than or equal to length of time of the TXOP of the base station, the uplink channel may be across TXOPs of two eNBs. That is, the initial position of the uplink channel is within the TXOP of the eNB, and the end position thereof is within the next TXOP of the eNB. Thus, switching from the outside of the TXOP to the next TXOP also requires listening type switching.

Whether the second uplink channel is in the idle state is determined by listening using the second listening type. When the second uplink channel is in the idle state, the uplink data is transmitted to the base station through the second uplink channel. That is, when the uplink channel scheduled for the user terminal is located outside the TXOP (TXOP of the UE) of the eNB, the uplink channel is listened using LBT Cat-4. When the TXOP of the corresponding UE is listened to be in the idle state, the uplink data signal to be transmitted is carried therein and transmitted to the base station.

Figure 10:
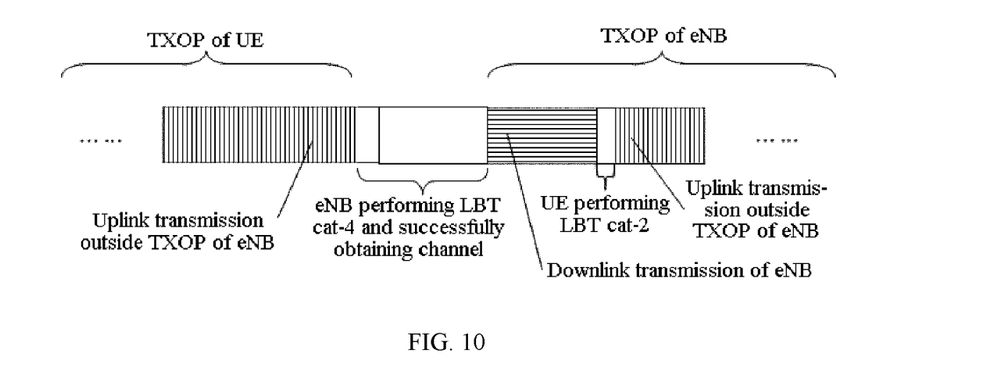
FIG. 10 is a second schematic diagram of transmission of a data transmission opportunity according to the fourth embodiment of the present disclosure.

When the second uplink channel ends and the first uplink channel starts, the second listening type is switched to the first listening type. Whether the first uplink channel is in the idle state is determined by listening using the first listening type. The uplink data is transmitted to the base station by the first uplink channel when the first uplink channel is in the idle state. That is, when the TXOP of the UE reaches the next TXOP of the eNB, the listening type needs to be switched. In particular, as shown in FIG. 10, when transmission does not end after the TXOP of the UE elapses, the eNB successfully obtains the channel through competition, and the next TXOP of the eNB starts. In accordance with an uplink and downlink switching instruction (e.g., TDD configuration information) transmitted by the eNB, when there still exists the scheduled uplink transmission that corresponds to the new TXOP of the eNB, the UE prepares for transmission on the uplink subframes and switches LBT cat-4 into LBT cat-2 for channel listening.

At Step 85, when the uplink channel is listened to be in an idle state using the listening type of the uplink channel, uplink data is transmitted to the base station in the uplink channel.

From the above, the base station transmits the indication information of the transmission opportunity occupied by the base station to the user terminal, so that the user terminal can determine the positional relationship between the uplink channel scheduled for the user terminal and the transmission opportunity used by the base station in accordance with the uplink scheduling information and the indication information of the transmission opportunity, and can automatically determine and switch the listening type at different positions. When the user terminal performs listening using a suitable listing type to determine that the corresponding uplink channel is in the idle state, the user terminal transmits the uplink data to be transmitted to the base station through the uplink channel. Thus, the user terminal can determine the positional relationship between the uplink channel scheduled for the user terminal and the transmission opportunity used by the base station in accordance with the uplink scheduling information and the indication information of the transmission opportunity, can automatically determine and switch the listening type at different positions, and can transmit the uplink data to the base station when an uplink channel is listened to be in the idle state. In this way, when the base station schedules multiple subframes for the user terminal requesting for uplink scheduling, the number of scheduled subframes will not be restricted by the current transmission opportunity, and the base station only needs to send the uplink scheduling information once. Thus, the downlink channel resource overhead can be reduced, and the network resources can be saved.

Fifth Embodiment

The above first to fourth embodiments introduce the uplink transmission method at the user terminal side. The followings will further describe a corresponding uplink transmission device with reference to the drawings in the present embodiment.

Figure 11:
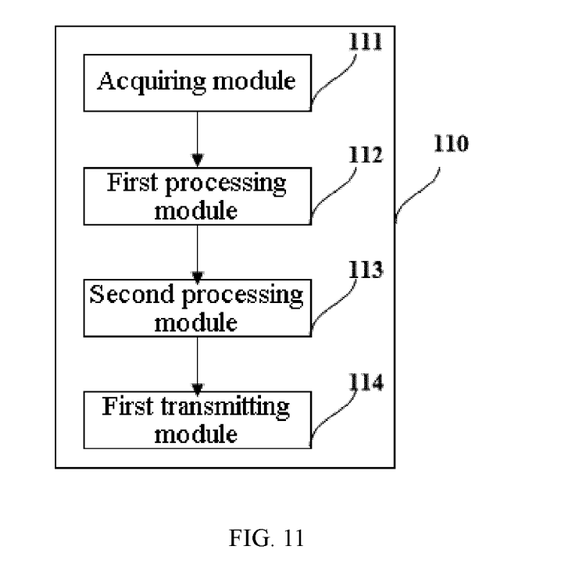
FIG. 11 is a module block diagram of an uplink transmission device according to a fifth embodiment of the present disclosure.

In particular, as shown in FIG. 11, the uplink transmission device provided by the embodiment of the present disclosure is applied in a user terminal 110 and at least includes:

an acquiring module 111 configured to acquire uplink scheduling information transmitted by a base station and indication information of a transmission opportunity currently occupied by the base station;

a first processing module 112 configured to determine a position of an uplink channel scheduled for the user terminal by the base station in accordance with the uplink scheduling information;

a second processing module 113 configured to determine a listening type of the uplink channel in accordance with the position of the uplink channel and the indication information of the transmission opportunity, wherein a listening type used when the uplink channel is within the transmission opportunity is different from a listening type used when the uplink channel is outside the transmission opportunity; and a first transmitting module 114 configured to transmit uplink data to the base station in the uplink channel when the uplink channel is listened to be in an idle state using the listening type of the uplink channel.

The indication information includes at least one of: information on a length of time occupied in the transmission opportunity, information on a length of remaining time other than the time occupied in the transmission opportunity, listening type information, listening type switching information, and a relationship between the listening type and a scheduled uplink channel.

The acquiring module 111 includes:

a first transmitting unit configured to transmit an uplink scheduling request to the base station currently accessed by the user terminal; and a first receiving unit configured to receive uplink scheduling information transmitted by the base station in response to the uplink scheduling request, the uplink scheduling information carrying the indication information of the transmission opportunity currently occupied by the base station.

The acquiring module 111 further includes:

a second transmitting unit configured to transmit an uplink scheduling request to the base station currently accessed by the user terminal; and a second receiving unit configured to receive uplink scheduling information transmitted by the base station in response to the uplink scheduling request, and receive the indication information, transmitted by the base station through a common channel, of the transmission opportunity currently occupied by the base station.

The second processing module 113 includes:

a first processing unit configured to determine the listening type of the uplink channel as a first listening type when the position of the uplink channel is within the transmission opportunity; and a second processing unit configured to determine the listening type of the uplink channel as a second listening type when the position of the uplink channel is outside the transmission opportunity, the second listening type being different from the first listening type.

Further, the uplink channel includes a first uplink channel within the transmission opportunity and a second uplink channel outside the transmission opportunity.

The first transmitting module 114 includes:

a first listening unit configured to listen to the first uplink channel using the first listening type to determine if the first uplink channel is in the idle state; and a third transmitting unit configured to transmit the uplink data to the base station in the first uplink channel when determining that the first uplink channel is in the idle state.

The first transmitting module 114 further includes:

a second listening unit configured to listen to the second uplink channel using the second listening type to determine if the second uplink channel is in the idle state;

a fourth transmitting unit configured to transmit the uplink data to the base station in the second uplink channel when determining that the second uplink channel is in the idle state.

The first transmitting module 114 further includes:

a first switching unit configured to switch from the first listening type to the second listening type when the first uplink channel ends and the second uplink channel starts;

a third listening unit configured to listen to the second uplink channel using the second listening type to determine if the second uplink channel is in the idle state; and a fifth transmitting unit configured to transmit the uplink data to the base station in the second uplink channel when determining that the second uplink channel is in the idle state.

The first transmitting module 114 further includes:

a second switching unit configured to switch from the second listening type to the first listening type when the second uplink channel ends and the first uplink channel starts;

a fourth listening unit configured to listen to the first uplink channel using the first listening type to determine if the first uplink channel is in the idle state; and a sixth transmitting unit configured to transmit the uplink data to the base station in the first uplink channel when determining that the first uplink channel is in the idle state.

The first transmitting module 114 further includes:

a selection unit configured to determine an access level of the second listening type in accordance with the indication information and the uplink data to be transmitted.

The second listening unit includes:

a first reserving sub-unit configured to reserve the last N subframes or symbols of the first uplink channel and/or the first N subframes or symbols of the second uplink channel as a listening channel, N being a positive integer; and a first listening sub-unit configured to listen to the second uplink channel using the second listening type in the listening channel to determine if the second uplink channel is in the idle state.

Further, the second uplink channel includes a plurality of uplink sub-channels. The second listening unit further includes:

a second reserving sub-unit configured to reserve N subframes or symbols at adjacent positions of other uplink sub-channels other than a first uplink sub-channel in the second uplink channel as a listening sub-channel; and a second listening sub-unit configured to listen to the uplink sub-channels other than the first uplink sub-channel of the second uplink channel in the listening sub-channel to determine if the uplink sub-channels other than a first uplink sub-channel of the second uplink channel are in the idle state.

The device embodiment of the present disclosure corresponds to the above method embodiment. All the realization means used in the above method embodiment can be applied in this device embodiment, and the same technical effects can be achieved by this device embodiment.

Sixth Embodiment

Figure 12:
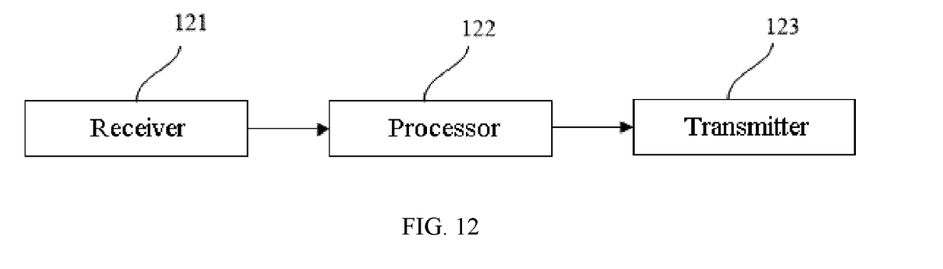
FIG. 12 is a structural block diagram of a user terminal according to a sixth embodiment of the present disclosure.

The present embodiment provides a user terminal corresponding to the uplink transmission method applied at a user terminal side described as above. As shown in FIG. 12, the user terminal in the present embodiment includes:

a receiver 121 configured to acquire uplink scheduling information transmitted by a base station and indication information of a transmission opportunity currently occupied by the base station;

a processor 122 connected to the transmitter and configured to: determine a position of an uplink channel scheduled for the user terminal by the base station in accordance with the uplink scheduling information; and determine a listening type of the uplink channel in accordance with the position of the uplink channel and the indication information of the transmission opportunity, wherein a listening type used when the uplink channel is within the transmission opportunity is different from a listening type used when the uplink channel is outside the transmission opportunity; and a transmitter 123 configured to transmit uplink data to the base station in the uplink channel when the uplink channel is listened to be in an idle state using the listening type of the uplink channel.

The processor 122 may also be configured to implement the functions of all the modules in the above device embodiment, and can achieve the same technical effects as the above device embodiment does.

Seventh Embodiment

This embodiment provides a non-transitory computer-readable storage medium, which stores computer instructions causing a computer to perform any of the uplink transmission methods applied at a user terminal side described in the above method embodiments.

Eighth Embodiment

This embodiment provides a computer program product including a computer program stored on a non-transitory computer readable storage medium. The computer program includes program instructions which, when executed by a computer, cause the computer to perform any of the uplink transmission methods applied at a user terminal side described in the above method embodiments.

Ninth Embodiment

The above first to eighth embodiments introduce the uplink transmission method and device, the user terminal, the non-transitory computer readable storage medium and the computer program product of the present disclosure from the base station side. In the following, the embodiment will introduce the uplink transmission method of the present disclosure from a corresponding base station side.

Figure 13:
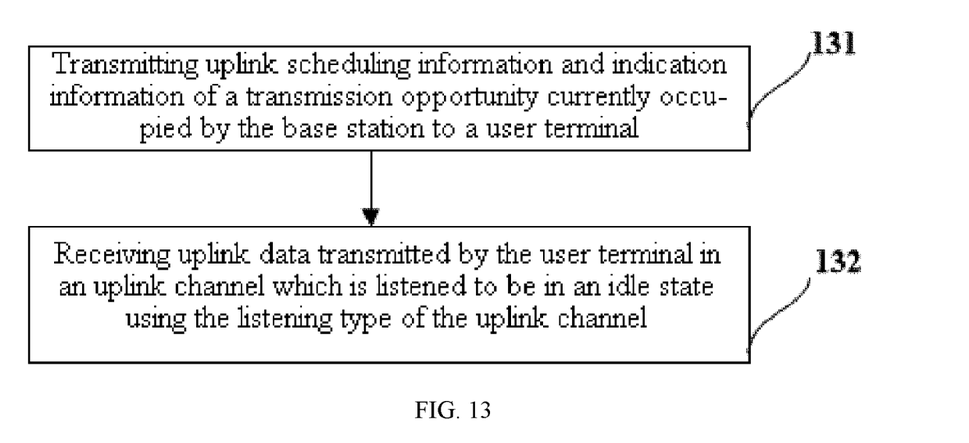
FIG. 13 is a flowchart of an uplink transmission method according to a ninth embodiment of the present disclosure.

As shown in FIG. 13, the embodiment of the present disclosure provides an uplink transmission method, particularly including the following steps.

At Step 131, uplink scheduling information and indication information of a transmission opportunity currently occupied by the base station are transmitted to a user terminal.

In this way, the user terminal determines a position of an uplink channel scheduled for the user terminal by the base station in accordance with the uplink scheduling information and determines a listening type of the uplink channel in accordance with the position of the uplink channel and the indication information of the transmission opportunity. A listening type used when the uplink channel is within the transmission opportunity is different from a listening type used when the uplink channel is outside the transmission opportunity.

The uplink scheduling information carries information which represents a position of a resource occupied by an uplink channel scheduled by the base station for the user terminal, for example, a serial number of the position of the resource occupied by the scheduled uplink channel. The uplink channel may be an uplink transmission channel for transmitting an uplink data signal, e.g., PUSCH, and may also be an uplink transmission channel for transmitting a control signal, such as ePUCCH or sPUCCH.

The TXOP of the base station means maximum allowable channel occupation time of the base station. The indication information of the TXOP of the base station carries indication information that represents a position of the TXOP of the base station, and in particular, includes at least one of information on a length of time occupied in the TXOP, information on a length of remaining time other than the time occupied in the TXOP, listening type information (such as LBT cat-2 or LBT cat-4), listening type switching information, and a relationship between the listening type and a scheduled uplink channel.

The step of transmitting the uplink scheduling information and the indication information of the transmission opportunity currently occupied by the base station to the user terminal includes: acquiring an uplink scheduling request transmitted by the user terminal covered by the base station; and in response to the uplink scheduling request, transmitting to the user terminal uplink scheduling information carrying the indication information of the transmission opportunity currently occupied by the base station.

When the uplink scheduling information carries the listening type information, an LBT type that corresponds to each subframe in the uplink scheduling information is indicated. For example, when M subframes are scheduled, the LBT type of each subframe is indicated by bitmap of M bits (0 represents LBT cat-2 and 1 represents LBT cat-4). In this way, the user terminal can determine the positional relationship between the uplink channel scheduled for the user terminal and the TXOP of the base station in accordance with the uplink scheduling information transmitted by the base station and carrying the indication information of the TXOP of the base station, and thus can automatically determine and switch the listening type at different positions.

Besides, the step of transmitting the uplink scheduling information and the indication information of the transmission opportunity currently occupied by the base station to the user terminal may be implemented by: acquiring an uplink scheduling request transmitted by the user terminal covered by the base station; transmitting to the user terminal uplink scheduling information in response to the uplink scheduling request; and transmitting the indication information of the transmission opportunity currently occupied by the base station to the user terminal through a common channel.

It is mentioned here that the uplink scheduling information transmitted by the base station to the user terminal does not carry the indication information of the TXOP of the base station. That is, the uplink scheduling information and the indication information of the TXOP of the base station are independently transmitted. In particular, the uplink scheduling information and the indication information of the TXOP of the base station may be transmitted in different channels. For example, the indication information of the TXOP of the base station may be carried in other common channels (e.g., C-PDCCH) for transmission. For example, the user terminal acquires the indication information of the TXOP of the base station through the other common channels, which carries information on a length of the TXOP of the base station, and determines that LBT cat-2 is performed before uplink transmission within the TXOP of the base station and LBT cat-4 is performed before uplink transmission outside the TXOP of the base station in accordance with the information on the length of the TXOP of the base station and the position of a scheduled uplink subframe indicated by the uplink scheduling information. In this way, when the base station schedules multiple subframes for the user terminal, restriction from the current TXOP of the base station can be prevented, and the base station only needs to transmit the uplink scheduling information once. Thus, the downlink channel resource overhead can be reduced, and the network resources can be saved.

At Step 132, uplink data transmitted by the user terminal in an uplink channel which is listened to be in an idle state using the listening type of the uplink channel is received.

From the above, the base station transmits the indication information of the transmission opportunity occupied by the base station to the user terminal, so that the user terminal can determine the positional relationship between the uplink channel scheduled for the user terminal and the transmission opportunity used by the base station in accordance with the uplink scheduling information and the indication information of the transmission opportunity, and can automatically determine and switch the listening type at different positions. When the user terminal performs listening using a suitable listing type to determine that the corresponding uplink channel is in the idle state, the user terminal transmits the uplink data to be transmitted to the base station through the uplink channel. Thus, the user terminal can determine the positional relationship between the uplink channel scheduled for the user terminal and the transmission opportunity used by the base station in accordance with the uplink scheduling information and the indication information of the transmission opportunity, can automatically determine and switch the listening type at different positions, and can transmit the uplink data to the base station when an uplink channel is listened to be in the idle state. In this way, when the base station schedules multiple subframes for the user terminal requesting for uplink scheduling, the number of scheduled subframes will not be restricted by the current transmission opportunity, and the base station only needs to send the uplink scheduling information once. Thus, the downlink channel resource overhead can be reduced, and the network resources can be saved.

Tenth Embodiment

The uplink transmission method performed at the base station side has been described in the ninth embodiment, and the corresponding uplink transmission device will be further explained with reference to the drawings in the present embodiment.

Figure 14:
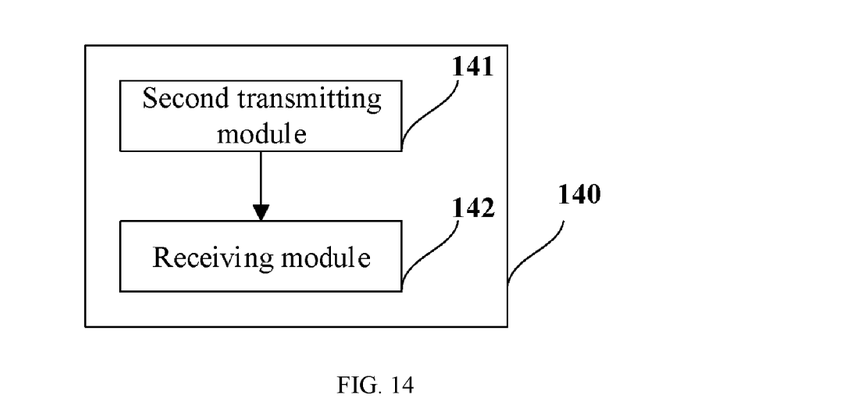
FIG. 14 is a structural block diagram of a user terminal according to a tenth embodiment of the present disclosure.

Specifically, as shown in FIG. 14, the uplink transmission device in the present embodiment of the present disclosure is applied in a base station 140 and at least includes:

a second transmitting module 141 configured to transmit uplink scheduling information and indication information of a transmission opportunity currently occupied by the base station to a user terminal, such that the user terminal determines a position of an uplink channel scheduled by the base station for the user terminal in accordance with the uplink scheduling information and determines a listening type of the uplink channel in accordance with the position of the uplink channel and the indication information of the transmission opportunity, wherein a listening type used when the uplink channel is within the transmission oppor-tunity is different from a listening type used when the uplink channel is outside the transmission opportunity; and a receiving module 142 configured to receive uplink data transmitted by the user terminal in an uplink channel which is listened to be in an idle state using the listening type of the uplink channel.

The indication information includes at least one of: information on a length of time occupied in the transmission opportunity, information on a length of remaining time other than the time occupied in the transmission opportunity, listening type information, listening type switching information, and a relationship between the listening type and a scheduled uplink channel.

The second transmitting module 141 includes:

a second acquiring unit configured to acquire an uplink scheduling request transmitted by the user terminal covered by the base station; and a seventh transmitting unit configured to transmit, in response to the uplink scheduling request, to the user terminal uplink scheduling information carrying the indication information of the transmission opportunity currently occupied by the base station.

The second transmitting module 141 further includes:

a second acquiring unit configured to acquire an uplink scheduling request transmitted by the user terminal covered by the base station;

an eighth transmitting unit configured to transmit uplink scheduling information to the user terminal in response to the uplink scheduling request; and a ninth transmitting unit configured to transmit to the user terminal the indication information of the transmission opportunity currently occupied by the base station through a common channel.

The device embodiment of the present disclosure corresponds to the above method embodiment. All the realization means used in the above method embodiment can be applied in this device embodiment, and the same technical effects can be achieved by this device embodiment.

Eleventh Embodiment

Figure 15:
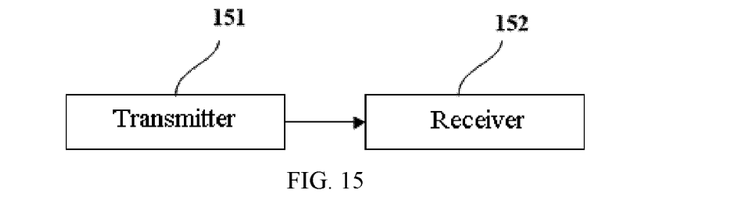
FIG. 15 is a structural block diagram of a base station according to an eleventh embodiment of the present disclosure.

The present embodiment provides a base station corresponding to the uplink transmission method applied at a base station side described as above. As shown in FIG. 15, the base station in the present embodiment includes:

a transmitter 151 configured to transmit uplink scheduling information and indication information of a transmission opportunity currently occupied by the base station to a user terminal, such that the user terminal determines a position of an uplink channel scheduled by the base station for the user terminal in accordance with the uplink scheduling information, and determines a listening type of the uplink channel in accordance with the position of the uplink channel and the indication information of the transmission opportunity, wherein a listening type used when the uplink channel is within the transmission opportunity is different from a listening type used when the uplink channel is outside the transmission opportunity; and a receiver 152 configured to receive uplink data transmitted by the user terminal in an uplink channel which is listened to be in an idle state using the listening type of the uplink channel.

The base station 150 can achieve the same technical effects as the above device embodiment does.

Twelfth Embodiment

This embodiment provides a non-transitory computer-readable storage medium, which stores computer instructions causing a computer to perform any of the uplink transmission methods applied at a base station side described in the above method embodiments.

Thirteenth Embodiment

This embodiment provides a computer program product including a computer program stored on a non-transitory computer readable storage medium. The computer program includes program instructions which, when executed by a computer, cause the computer to perform any of the uplink transmission methods applied at a base station side described in the above method embodiments.

Further, it should be noted that in the devices and methods of the present disclosure, the respective parts or steps can be obviously decomposed and/or recombined. These decomposed and/or recombined solutions should be regarded as equivalent solutions of the present disclosure. In addition, the steps of performing the above processes can be naturally executed in accordance with the time sequence described in the present description, but they may not be necessarily executed in accordance with the time sequence. Some steps may be executed in parallel or independently. Those skilled in the art shall understand that all or any step or part of the devices and methods of the present disclosure can be realized by hardware, firmware, software or a combination thereof in any computing device (including processors, storage media and the like) or a network of any computing devices. This can be realized by those skilled in the art using their basic programming skills after reading the description of the present disclosure.

Therefore, the purposes of the present disclosure can also be realized by running a program or a group of programs on any computing device which may be a known general device. Therefore, the purposes of the present disclosure can also be realized by a program product including the program codes for realizing the above methods or devices. In other words, such program products also constitute the present disclosure, and storage media storing such program products also constitute the present disclosure. Obviously, the storage media may be any known storage media or any storage media developed in the future. It also should be noted that in the devices and methods of the present disclosure, the respective parts or steps can be obviously decomposed and/or recombined. These decomposed and/or recombined solutions should be regarded as equivalent solutions of the present disclosure. In addition, the steps of performing the above processes can be naturally executed in accordance with the time sequence described in the present description, but they may not be necessarily executed in accordance with the time sequence. Some steps may be executed in parallel or independently.

The foregoing are merely preferable embodiments of the present disclosure. It should be noted that those skilled in the art can make several improvements and modifications without departing from the principle of the present disclosure, and these improvements and modifications should be regarded to fall within the protection scope of the present disclosure.

What is claimed is:

1. An uplink transmission method applied in and performed by a user terminal, comprising:
acquiring uplink scheduling information transmitted by a base station and indication information of a transmission opportunity currently occupied by the base station, wherein the uplink scheduling information carries information which represents a position of a resource occupied by an uplink channel, and uplink channel being scheduled by the base station for the user terminal;
determining the position of the uplink channel in accordance with the uplink scheduling information;
determining a listening type of the uplink channel in accordance with the position of the uplink channel and the indication information of the transmission opportunity, wherein a listening type used when the uplink channel is within the transmission opportunity is different from a listening type used when the uplink channel is outside the transmission opportunity; and
transmitting uplink data to the base station in the uplink channel when the uplink channel is listened to be in an idle state using the listening type of the uplink channel.

2. The uplink transmission method according to claim 1, wherein the indication information includes at least one of: information on a length of time occupied in the transmission opportunity, information on a length of remaining time other than the time occupied in the transmission opportunity, listening type information, listening type switching information, or a relationship between the listening type and a scheduled uplink channel.

3. The uplink transmission method according to claim 2, wherein acquiring the uplink scheduling information transmitted by the base station and the indication information of the transmission opportunity currently occupied by the base station comprises:
transmitting an uplink scheduling request to the base station currently accessed by the user terminal; and
receiving the uplink scheduling information transmitted by the base station in response to the uplink scheduling request, the uplink scheduling information carrying the indication information of the transmission opportunity currently occupied by the base station.

4. The uplink transmission method according to claim 2, wherein acquiring the uplink scheduling information transmitted by the base station and the indication information of the transmission opportunity currently occupied by the base station comprises:
transmitting an uplink scheduling request to the base station currently accessed by the user terminal; and
receiving the uplink scheduling information transmitted by the base station in response to the uplink scheduling request, and receiving the indication information of the transmission opportunity currently occupied by the base station, the indication information being transmitted by the base station through a common channel.

5. The uplink transmission method according to claim 1, wherein determining the listening type of the uplink channel in accordance with the position of the uplink channel and the indication information of the transmission opportunity comprises:
determining the listening type of the uplink channel as a first listening type, when the position of the uplink channel is within the transmission opportunity; and
determining the listening type of the uplink channel as a second listening type, the second listening type being different from the first listening type, when the position of the uplink channel is outside the transmission opportunity.

6. An uplink transmission method applied in a user terminal and comprising:
acquiring uplink scheduling information transmitted by a base station and indication information of a transmission opportunity currently occupied by the base station;

determining a position of an uplink channel scheduled for the user terminal by the base station in accordance with the uplink scheduling information;

determining a listening type of the uplink channel in accordance with the position of the uplink channel and the indication information of the transmission opportunity, wherein a listening type used when the uplink channel is within the transmission opportunity is different from a listening type used when the uplink channel is outside the transmission opportunity; and transmitting uplink data to the base station in the uplink channel when the uplink channel is listened to be in an idle state using the listening type of the uplink channel, wherein determining the listening type of the uplink channel in accordance with the position of the uplink channel and the indication information of the transmission opportunity comprises:

determining the listening type of the uplink channel as a first listening type, when the position of the uplink channel is within the transmission opportunity; and determining the listening type of the uplink channel as a second listening type, the second listening type being different from the first listening type, when the position of the uplink channel is outside the transmission opportunity;

wherein the uplink channel comprises a first uplink channel within the transmission opportunity and a second uplink channel outside the transmission opportunity; and wherein transmitting uplink data to the base station in the uplink channel when the uplink channel is listened to be in an idle state using the listening type of the uplink channel comprises:

listening to the first uplink channel using the first listening type to determine if the first uplink channel is in the idle state; and transmitting the uplink data to the base station in the first uplink channel when determining that the first uplink channel is in the idle state.

7. The uplink transmission method according to claim 6, wherein transmitting uplink data to the base station in the uplink channel when the uplink channel is listened to be in an idle state using the listening type of the uplink channel comprises:

listening to the second uplink channel using the second listening type to determine if the second uplink channel is in the idle state; and transmitting the uplink data to the base station in the second uplink channel when determining that the second uplink channel is in the idle state.

8. The uplink transmission method according to claim 6, wherein the method further comprises, after transmitting the uplink data to the base station in the first uplink channel when determining that the first uplink channel is in the idle state:

switching from the first listening type to the second listening type when the first uplink channel ends and the second uplink channel starts;

listening to the second uplink channel using the second listening type to determine if the second uplink channel is in the idle state; and transmitting the uplink data to the base station in the second uplink channel when determining that the second uplink channel is in the idle state.

9. The uplink transmission method according to claim 7, wherein the method further comprises, after transmitting the uplink data to the base station in the second uplink channel when determining that the second uplink channel is in the idle state:

switching from the second listening type to the first listening type when the second uplink channel ends and the first uplink channel starts;

listening to the first uplink channel using the first listening type to determine if the first uplink channel is in the idle state; and transmitting the uplink data to the base station in the first uplink channel when determining that the first uplink channel is in the idle state.

10. The uplink transmission method according to claim 7, wherein the method further comprises, prior to listening to the second uplink channel using the second listening type to determine if the second uplink channel is in the idle state:

determining an access level of the second listening type in accordance with the indication information and uplink data to be transmitted.

11. The uplink transmission method according to claim 7, wherein listening to the second uplink channel using the second listening type to determine if the second uplink channel is in the idle state comprises:

reserving last N subframes or symbols of the first uplink channel and/or first N subframes or symbols of the second uplink channel as a listening channel, N being a positive integer; and listening to the second uplink channel using the second listening type in the listening channel to determine if the second uplink channel is in the idle state.

12. The uplink transmission method according to claim 11, wherein the second uplink channel comprises multiple uplink sub-channels;

wherein the method further comprises, after listening to the second uplink channel using the second listening type in the listening channel to determine if the second uplink channel is in the idle state:

reserving N subframes or symbols at adjacent positions of uplink sub-channels other than a first uplink sub-channel in the second uplink channel as a listening sub-channel; and listening to the uplink sub-channels other than the first uplink sub-channel of the second uplink channel in the listening sub-channel to determine if the uplink sub-channels other than a first uplink sub-channel of the second uplink channel are in the idle state.

13. An uplink transmission method applied in a base station and comprising:

transmitting uplink scheduling information and indication information of a transmission opportunity currently occupied by the base station to a user terminal, such that a position of an uplink channel scheduled by the base station for the user terminal is determined by the user terminal in accordance with the uplink scheduling information and a listening type of the uplink channel is determined by the user terminal in accordance with the position of the uplink channel and the indication information of the transmission opportunity, wherein the uplink scheduling information carries information which represents the position of a resource occupied by the uplink channel, a listening type used when the uplink channel is within the transmission opportunity is different from a listening type used when the uplink channel is outside the transmission opportunity; and receiving uplink data transmitted by the user terminal in an uplink channel which is listened to be in an idle state using the listening type of the uplink channel.

14. The uplink transmission method according to claim 13, wherein the indication information includes at least one of: information on a length of time occupied in the transmission opportunity, information on a length of remaining time other than the time occupied in the transmission opportunity, listening type information, listening type switching information, or a relationship between the listening type and a scheduled uplink channel.

15. The uplink transmission method according to claim 14, wherein transmitting uplink scheduling information and indication information of a transmission opportunity currently occupied by the base station to a user terminal comprises:
  acquiring an uplink scheduling request transmitted by the user terminal covered by the base station; and
  transmitting to the user terminal uplink scheduling information carrying the indication information of the transmission opportunity currently occupied by the base station in accordance with the uplink scheduling request.

* * * * *